F. VERPLAST.
COIN CONTROLLED WEIGHING MACHINE.
APPLICATION FILED OCT. 16, 1905.

906,755.

Patented Dec. 15, 1908.

4 SHEETS—SHEET 1.

Witnesses:
H. B. Davis
Cynthia Doyle

Inventor:
Frederick Verplast
by Hayes & Harriman
Attys

F. VERPLAST.
COIN CONTROLLED WEIGHING MACHINE.
APPLICATION FILED OCT. 16, 1905.

906,755.

Patented Dec. 15, 1908.

4 SHEETS—SHEET 2.

Witnesses:
H. B. Davis
Cynthia Doyle

Inventor:
Frederick Verplast
by Ayres & Harriman
Atty.

F. VERPLAST.
COIN CONTROLLED WEIGHING MACHINE.
APPLICATION FILED OCT. 16, 1905.
906,755.
Patented Dec. 15, 1908
4 SHEETS—SHEET 3.
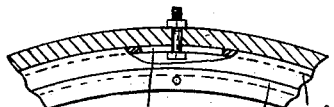
Fig. 4
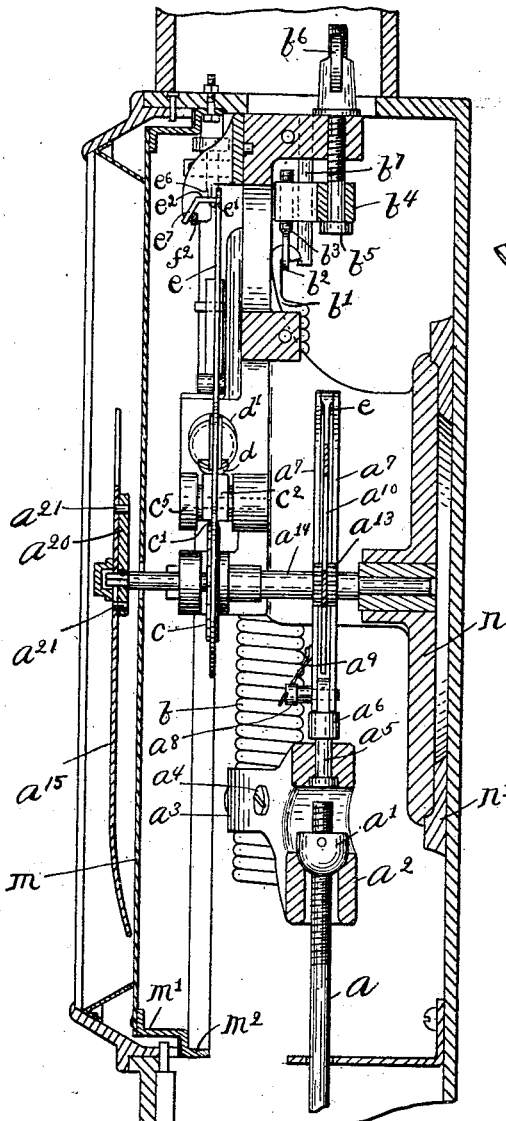
Fig. 3
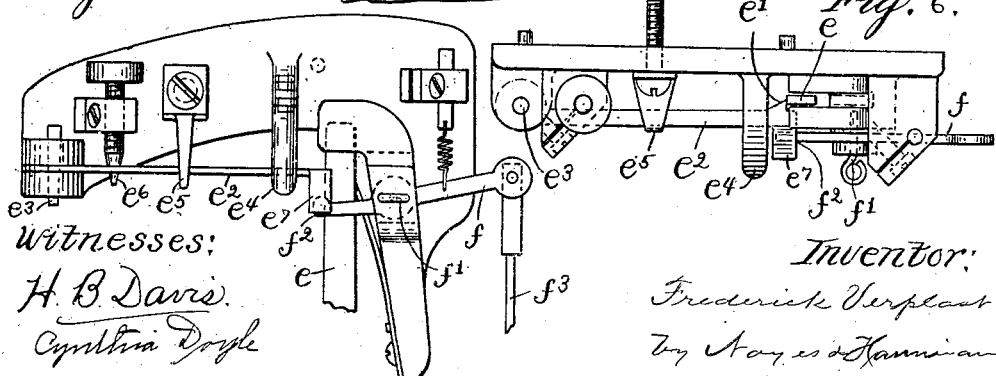
Fig. 5.
Fig. 6.
Witnesses:
H. B. Davis.
Cynthia Doyle.
Inventor:
Frederick Verplast
by Hayes & Hanniman
Attys
THE NORRIS PETERS CO., WASHINGTON, D. C.

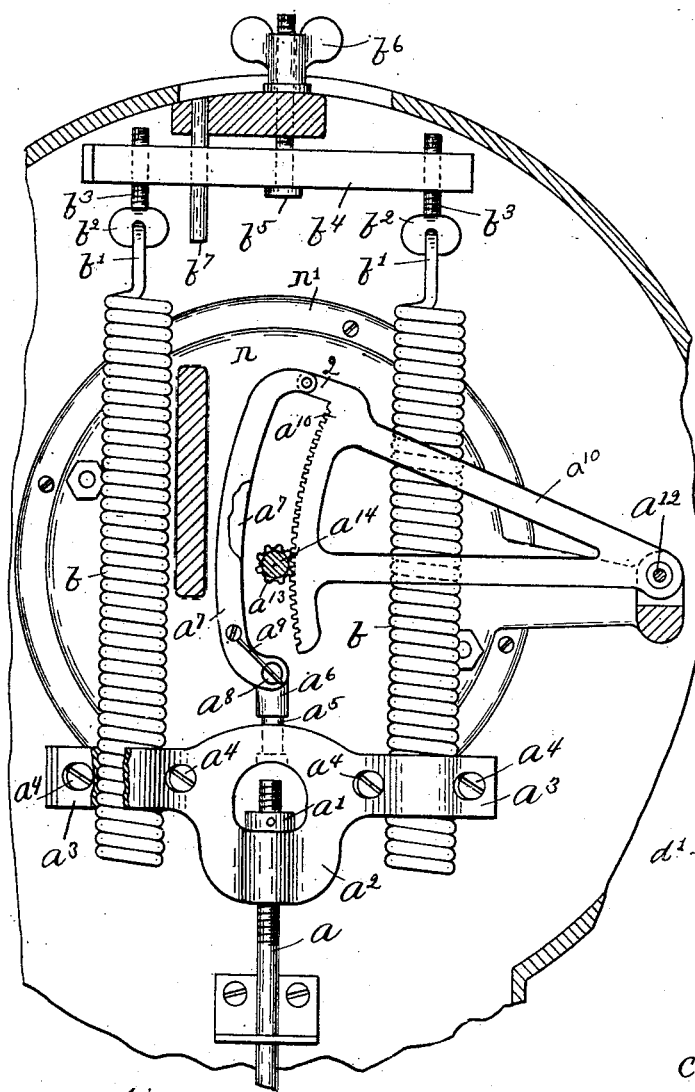
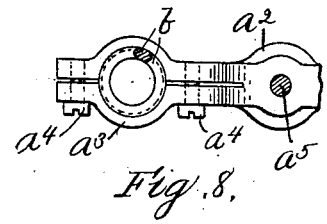
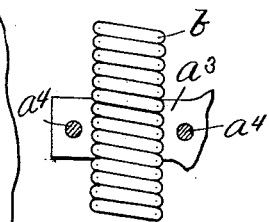
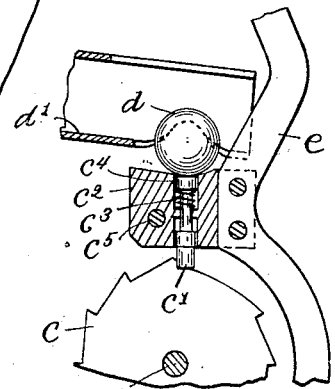
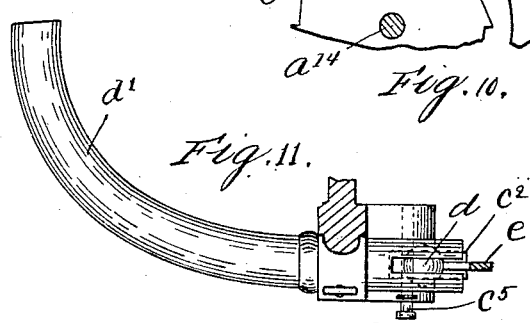

UNITED STATES PATENT OFFICE.

FREDERICK VERPLAST, OF BOSTON, MASSACHUSETTS.

COIN-CONTROLLED WEIGHING-MACHINE.

No. 906,755.  Specification of Letters Patent.  Patented Dec. 15, 1908.

Application filed October 16, 1905. Serial No. 282,902.

*To all whom it may concern:*

Be it known that I, FREDERICK VERPLAST, of Boston, county of Suffolk, State of Massachusetts, have invented an Improvement in Coin - Controlled Weighing - Machines, of which the following description, in connection with the accompanying drawings, is a specification, like characters on the drawings representing like parts.

This invention relates to coin-controlled weighing-machines, and has for its object to connect the pointer-carrying shaft with a spring balanced platform-rod and to provide a locking-device for holding said shaft and platform-rod, which is connected therewith, against the action of the weight upon said platform rod, and also to provide coin-controlled mechanism for disengaging said locking-device, and also to provide means for holding said locking-device disengaged for a predetermined period of time when released, whereby the pointer will be permitted to move whenever a coin is dropped into the coin-receiving tube, and will be locked after a predetermined period of time, during which period of time the pointer will move over the dial to indicate the weight, and said pointer when thus locked will remain locked until the person steps from the platform.

The invention also has for its object to improve the construction of the parts in many different particulars as will be hereinafter described.

Figure 1:
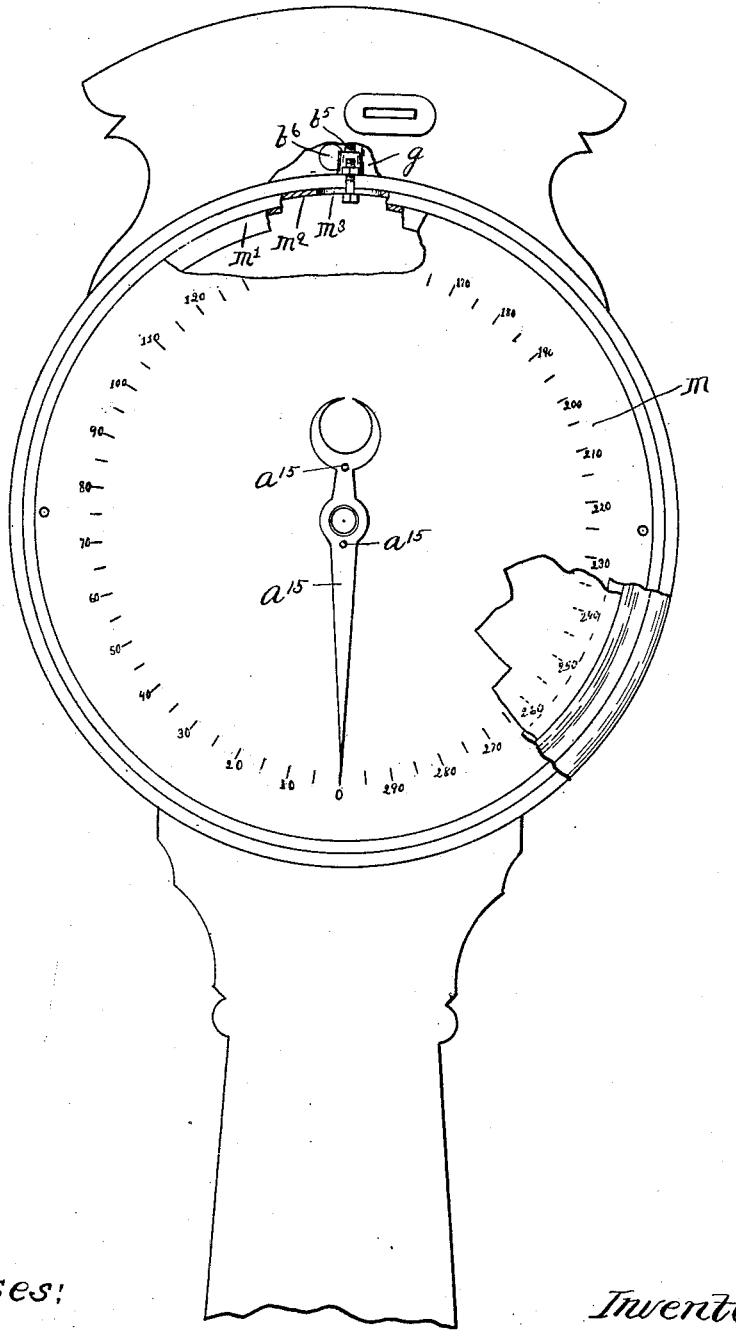
Figure 2:
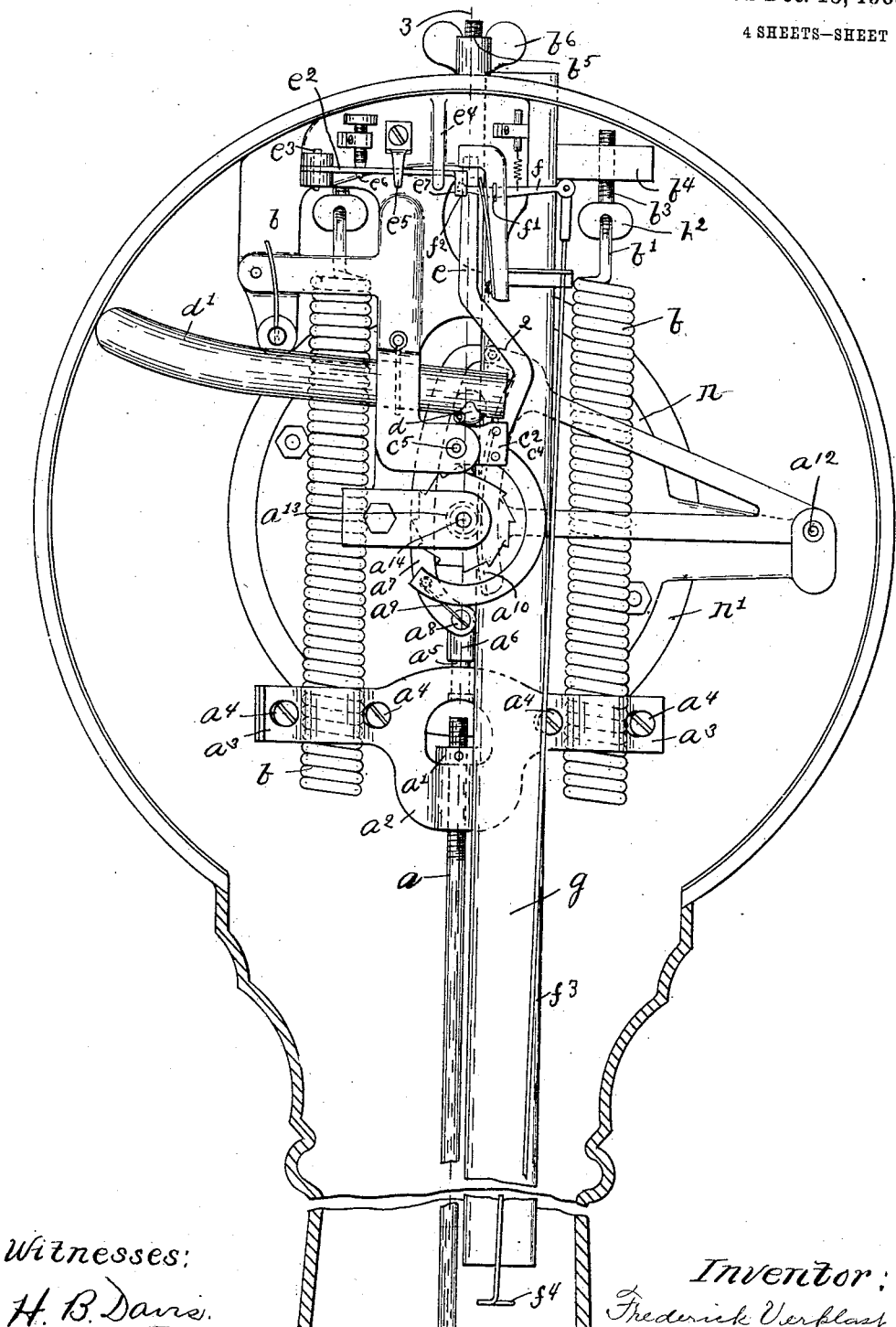

Figure 1 shows in front elevation a portion of a coin-controlled weighing-machine embodying this invention. Fig. 2, is an enlarged front elevation of the weighing-machine shown in Fig. 1, the dial-plate being removed to expose the working parts. Fig. 3 is a vertical section of the weighing-machine shown in Fig. 2, taken on the dotted line 3—3. Fig. 4 is a detail showing a portion of the ring supporting the dial-plate, and the adjusting-device therefor. Fig. 5, is a detail showing in front elevation a coin-controlled releasing-mechanism for the locking device. Fig. 6 is a plan view of the parts shown in Fig. 5. Fig. 7 is an enlarged-detail showing in front elevation a spring balanced platform-rod and means for connecting it with the pointer-carrying shaft. Figs. 8 and 9 are details of the means employed for adjustably attaching the springs. Figs. 10 and 11 are details showing the locking-device for the pointer-carrying shaft and actuator therefor, which, when operated is disengaged therefrom for a predetermined period of time to enable the pointer to move over the dial and indicate the weight.

$a$ represents the platform-rod, which is attached at its lower end to a platform, not shown, in any usual or suitable manner. The upper end of the platform-rod is screw threaded and receives upon it a nut $a'$, which is made more or less spherical, see Fig. 2.

$a^2$ is a yoke or frame having a vertical hole through it for the rod $a$, the upper end of which is formed with a cup-shaped recess to receive the spherical nut $a'$, thereby providing a connection between the yoke or frame and the platform-rod and affording an easy movement of said yoke or frame relative to said rod. The yoke or frame $a^2$ has two oppositely extended arms $a^3$, $a^3$, which are split longitudinally from their extremities inward nearly to the middle, and said split arms are each formed with a spirally threaded hole extending through it vertically, which is adapted to receive and snugly engage the lower end of a spiral spring $b$. The springs $b$ are held firmly in engagement with said arms by drawing the split portions thereof together, which is accomplished by a screw $a^4$ passing through each arm. The split arms $a^3$ will engage the springs $b$, at any part thereof, thereby providing for excessive independent, longitudinal adjustment of the springs relative to the platform-rod.

The upper ends of the springs $b$ are formed with hooks $b'$, which pass through holes formed in the heads $b^2$ of adjusting screws $b^3$, which are screwed into the under side of a plate $b^4$, or other form of support, at points near the opposite ends thereof, and said springs are adjustable longitudinally, independently of each other, by means of these screws. The support $b^4$ is adjustably secured to a part of the frame, as for instance, by a headed screw $b^5$, which passes up through a hole in the support and through a hole in the frame and which receives upon its upwardly projecting end a nut $b^6$, which bears upon the frame. By turning this nut the support $b^4$ will be adjusted to different elevations.

The support $b^4$ is held from turning with relation to the frame by a pin $b^7$, which is secured to the frame and which extends down into or through a hole in the support.

By adjusting the support $b^4$ to different elevations the two springs $b$, $b$, will be simultaneously adjusted longitudinally, hence it will be observed that means for independently and simultaneously adjusting the springs is provided. The yoke or frame $a^2$ has a pin $a^5$ projecting upwardly from it, which is formed at its upper end with an ear $a^6$, and a pair of curved links $a^7$ are disposed at opposite sides of said ear, which are loosely connected thereto by a pin $a^8$, which is held from turning by a spring arm $a^9$, attached at one end to one of the links, its opposite or free end overlying the head of said pin, which latter is slotted to receive it. The upper ends of said links $a^7$, $a^7$, are both loosely connected to an ear 2, which is provided at the upper end of a toothed sector $a^{10}$, pivoted at $a^{12}$ to the frame, and said toothed sector engages a pinion $a^{13}$ secured to the center shaft $a^{14}$ which bears the indicating hand or pointer $a^{15}$. As the platform-rod descends the toothed sector is moved downward by the link connection with the yoke or frame $a^2$, and the pointer-carrying shaft is revolved. By providing a pair of links and curving them longitudinally and attaching them to an ear at the upper end of the toothed sector, an easy movement of said sector is obtained without straining or twisting the parts.

A ratchet wheel $c$ or other form of toothed wheel having any required number of teeth is rigidly secured to the pointer-carrying shaft $a^{14}$, and a locking-pin $c'$ is provided which is adapted to engage the teeth of said wheel, to hold it in fixed position. Normally, the locking-pin is in engagement with one of the teeth of said wheel, and when a person steps upon the platform the weight upon the platform-rod and parts connected thereto is resisted by said ratchet-wheel engaging said locking-pin, and not until said pin is moved out of engagement with said wheel can the weight cause the operation of the moving parts and turn the pointer-carrying shaft, hence until such time, even though the person remains standing on the platform, all the parts will remain at rest. Therefore, the ratchet-wheel and locking-pin engaging it, serve as, and constitute a locking-device for locking the pointer-carrying shaft which is connected with the platform-rod in such manner as to resist the action of the weight upon said platform rod. The locking-pin $c'$ is supported by a block $c^2$, or other form of support, see Fig. 10, which has a hole through it adapted to receive said pin and in which said pin is free to move longitudinally. A spiral spring $c^3$ surrounds the shank of said pin and bears against the head $c^4$ thereof, the action of which is to lift the pin when permitted to act. The pin, however, is normally held in engagement with said ratchet-wheel and its lifting spring compressed, by a weight which rests upon its upper end, and which, as herein shown, consists of a ball $d$. An inclined guideway $d'$ is provided for the ball $d$, which, as herein shown, consists of a tube of suitable diameter to provide for the unobstructed passage of the ball from end to end thereof. This tube is curved in order to provide a long tube in the small space allotted to it. The tube has, at or near its lower end, and at the bottom thereof, an opening through which the ball projects, when in its lowermost position, and said opening is located directly over the locking-pin, so that when the ball occupies its lowermost position in the inclined guideway, it will rest upon the head of the locking-pin $d'$ and will thrust said pin downward, into engagement with the teeth of the ratchet-wheel, against the action of the spiral spring $c^3$. Whenever the ball is removed from engagement with the locking-pin, said pin will be lifted by the spring $c^3$, and will remain in elevated position until again pressed down by the ball. Thus the ball $d$ serves as the actuator for the locking-pin.

The block $c^2$ or other support, is pivoted at $c^5$ to the frame and occupies a position between the tube $d'$ and ratchet wheel $c$, sufficient space being allotted to it to enable it to be moved on its pivot a short distance. The ball $d$, when resting upon the head of the locking-pin and holding said pin down, is supported by or upon the block $c^2$, and being thus supported will be moved by an upward movement of said block out of engagement with the locking-pin. The block $c^2$ has attached to it a bent bar which extends both upward and downward. The lower end of said bar is semicircularly formed and extends around the ratchet-wheel $c$, but free from contact therewith, and acts as a counterbalance for the bar; and the upper end of said bar extends upward into engagement with a detent $e'$, see Figs. 5 and 6. The pivoted block carries the bar, hence the pivot $c^5$ of the block serves as the pivot for the bar. The upper end of the bar $e$ normally bears against the detent $e'$, and at such time the actuator $d$ rests upon the locking-pin, and said pin engages the ratchet-wheel, and this will be the normal position of the parts when the person first steps upon the platform and until a coin, which it is intended shall operate the apparatus, has been deposited.

Although the weight of the person may be considerable the leverage is reduced so that the bar $e$ exerts but little pressure upon the detent $e'$. The detent $e'$ is formed integral with or is borne by an arm $e^2$, pivoted at $e^3$ to the frame, and said arm passes through a horizontal slot in an ear $e^4$ on the frame, the opposite ends of which limit the in and out movements of the arm $e^2$; and said arm is pressed inwards, with its detent in position to engage the bar $e$, by means of a spring $e^5$. Adjustment of said arm $e^2$ in one direction is obtained by means of a conical pointed screw $e^6$, against the conical end of which said arm is pressed by the spring $e^5$. Whenever the arm $e^2$ is moved outward its detent $e'$ will disengage the lever $e$, and the latter will be released. The arm $e^2$ has, at or near its extremity, a cam $e^7$, which is formed integral therewith, and which extends downward for a short distance, and a lever $f$, pivoted at $f'$, at a point intermediate its length, is provided for moving said arm $e^2$ to release the lever $e$. The lever $f$ is formed at one end with a more or less spherical portion $f^2$, which engages the cam $e^7$, and the opposite end of said lever has loosely connected to it a long rod $f^3$, which extends down along the outside, or it may be the inside, of a flat tube $g$, and has at its lower end a rest or support $f^4$, formed by bending the end of the rod semicircularly and at right angles to the rod itself, or the rest or support may be otherwise formed on the rod; and said rest or support occupies a position beneath the lower open end of the flat tube $g$.

The tube $g$ extends to the top of the frame of the machine and is open at the top for the introduction of a coin. The coin, when introduced, falls by gravity down the tube and strikes upon the rest or support $f^4$, and by its weight and momentum forces the rod $f^3$ downward and moves the lever $f$ on its pivot, causing the latter to engage the cam $e^7$ and move the arm $e^2$ on its pivot in an outward direction and thereby remove the detent from engagement with the bar $e$. The weight of the person, acting to turn the ratchet-wheel against the locking-pin, will immediately turn said wheel the moment the bar $e$ is thus released, and the tooth of said ratchet-wheel, which normally engages the locking-pin, will pass beneath said pin by lifting the block $c^2$ on its pivot. This upward movement of the block $c^2$, is very sudden and consequently the ball, which is supported by it, will be violently thrown up and along the inclined guideway $d'$ to a point near the remote end thereof. The block $c^2$, however, immediately resumes its normal position, but the locking-pin borne by it is raised by the lifting spring $c^3$ the moment the ball is removed and is held in its elevated position by said spring $c^3$, on the return of the block, so that the ratchet-wheel when thus released, is free to turn. The ratchet-wheel continues to turn until the spring pressed platform comes to rest and the pointer-carrying shaft has been turned to indicate the correct weight on a dial provided for the purpose. For the ratchet-wheel to thus turn and move the pointer over the indicating dial to indicate the weight of the person, a perceptible period of time is required, and during this time the ball is moving up the tube and is returning, and about the time the platform comes to rest the ball resumes its normal or lowermost position and again engages the locking-pin, and moves said pin into engagement with the ratchet-wheel, thereby locking said wheel in whatever position it may occupy at the time, with the weight indicated by the pointer on the dial. The parts will remain in this position until the person steps from the platform, when the ratchet-wheel will resume its normal position, its teeth passing freely beneath the locking-pin, which latter is repeatedly raised by the teeth passing beneath it. The ratchet-wheel is returned to its normal position by the action of the weighing springs $b$, operating to return the platform to a balanced position when the weight is removed therefrom. The releasing-lever $f$ returns to its normal position as soon as the coin engages the rest or support $f^4$ and forces the rod downward, such movement being sufficient to enable the coin to pass from the tube into any suitable receptacle, not shown, which may be provided for it.

By the mechanism thus described it will be seen that the coin operates to release the ratchet-wheel, which is free to turn for a short period of time, during which the ball is making its excursion along the inclined guideway $d'$, and then said ratchet-wheel becomes positively locked, and this period of time is sufficient, under ordinary conditions, for the pointer-carrying shaft to turn and cause the pointer to indicate the weight of the person. The pointer moves over the dial a greater distance corresponding to the weight, and the ball is thrust up by the guideway with a force proportional to the weight upon the platform, the greater the weight, the further the ball will be forced up the guideway and consequently the longer the period of time which will elapse before the ball returns and again engages the locking-pin. In any event, however, the period of time is sufficient for the pointer to move over the dial and come to rest to indicate the weight.

The end of the pointer-carrying shaft $a^{14}$ is squared and a plate $a^{20}$ is keyed thereto, and the pointer $a^{15}$ is secured to said plate by pins $a^{21}$.

The pointer-carrying shaft has its bearings in the frame which comprises essentially a circular base plate $n$, and the other parts of the mechanism above described are supported by integral portions of the frame or parts secured thereto, and said circular base plate $n$ is fitted into a circular seat formed in a plate or ring, which is rigidly secured to the rear wall of the case. This frame and the parts supported by it are readily removable from the case, and when placed in the case, with the parts assembled, can be accurately fitted in position by placing the circular base plate into the circular seat provided for it. The assembled parts are thus localized in the case.

The dial plate $m$ is secured to a ring $m'$ having a flange $m^2$ formed with a slot $m^3$, and a bolt passes through said slot and through the wall of the case which secures said flanged ring in place. By thus slotting the ring the dial-plate may be adjusted on its axis.

Having thus described my invention, what I claim as new and desire to secure by Letters Patent is:—

1. In a weighing machine, the combination of a pointer-carrying shaft, a spring-balanced platform-rod, means, operated by said rod, for operating said shaft, a ratchet-wheel secured to said shaft, a locking-pin engaging said ratchet-wheel for holding the shaft, coin-controlled means for releasing said locking-pin, permitting the shaft to operate, means for moving said locking pin into unlocking position when released, and means for thereafter moving said locking-pin into locking position after a predetermined period of time in order that it may again engage the ratchet wheel, substantially as described.

2. In a weighing machine, the combination of a pointer-carrying shaft, a spring balanced platform-rod, means, operated by said rod, for operating said shaft, a ratchet-wheel secured to said shaft, a locking-pin engaging said ratchet-wheel for holding the shaft, coin-controlled means for releasing said locking-pin, permitting the shaft to operate, and an actuator, operated by said shaft when released, for moving said locking-pin into engagement with said ratchet-wheel after a predetermined period of time, substantially as described.

3. In a weighing machine, the combination of a pointer-carrying shaft, a spring balanced platform-rod, means, operated by said rod for operating said shaft, a ratchet-wheel secured to said shaft, a locking-pin engaging said ratchet-wheel, a support for said pin, adapted when released to be moved by the ratchet-wheel to disengage the pin therefrom, coin-controlled releasing-mechanism for said support and independent means for thereafter moving said locking-pin into engagement with said ratchet-wheel after a predetermined period of time, substantially as described.

4. In a weighing machine, the combination of a pointer-carrying shaft, a spring balanced platform-rod, means, operated by said rod, for operating said shaft, a ratchet-wheel secured to said shaft, a locking-pin for said ratchet-wheel, a movable support bearing said locking-pin, an actuator for said locking-pin, which is adapted to be moved by the ratchet-wheel to release said locking-pin for a predetermined period of time when the support for said pin is released, and coin-controlled releasing-mechanism for said support, substantially as described.

5. In a weighing machine, the combination of a pointer-carrying shaft, a spring balanced platform-rod, means, operated by said rod, for operating said shaft, a ratchet-wheel secured to said shaft, a locking-pin for said ratchet-wheel, a movable support bearing said locking-pin, a ball resting on the locking-pin, an inclined guide-way along which said ball is thrust by the ratchet-wheel, to release said locking-pin for a predetermined period of time when the support for said pin is released, and coin-controlled releasing-mechanism for said support, substantially as described.

6. In a weighing machine, the combination of a pointer-carrying shaft, a spring balanced platform-rod, means, operated by said rod for operating said shaft, a ratchet-wheel, secured to said shaft, a locking-pin for said ratchet-wheel, a pivoted support bearing said locking-pin, which is adapted to be moved on its pivot by the ratchet-wheel to disengage the locking-pin therefrom, means for holding said support against the action of said ratchet-wheel adapted to be released by a coin, and an actuator for thereafter moving the locking-pin into engagement with the ratchet-wheel after a predetermined period of time, substantially as described.

7. In a weighing machine, the combination of a pointer-carrying shaft, a spring balanced platform-rod, means, operated by said rod for operating said shaft, a ratchet-wheel secured to said shaft, a spring actuated locking-pin, an actuator for holding said pin in engagement with the ratchet-wheel, a movable support for said pin, which, when released moves said actuator to disengage said pin for a predetermined period of time, and coin-controlled releasing-mechanism for said support, substantially as described.

8. In a weighing machine, the combination of a pointer-carrying shaft, a spring balanced platform-rod, means, operated by said rod for operating said shaft, a ratchet-wheel secured to said shaft, a spring actuated locking-pin, a ball resting upon said pin for holding it in engagement with said ratchet-wheel, an inclined guide-way for said ball, a movable support for said pin, which, when released moves said ball up the inclined guideway, to thereby disengage said pin for a predetermined period of time, and coin-controlled releasing-mechanism for said support, substantially as described.

9. In a weighing machine, coin-controlled releasing-mechanism consisting of a rod having a rest disposed at the lower open end of a coin-receiving tube, a pivoted lever to which said rod is connected and a pivoted detent-carrying arm having a cam portion, and means for adjusting the movement of said detent-carrying arm, substantially as described.

10. In a weighing machine, coin-controlled releasing-mechanism consisting of a rod having a rest disposed at the lower open end of a coin-receiving tube, a pivoted lever to which said rod is connected and a pivoted detent-carrying arm adapted to be operated by said lever, and an arm bearing a locking device movable on an axis at right angles to the axis of the detent-carrying arm which engages the detent thereof, substantially as described.

In testimony whereof, I have signed my name to this specification, in the presence of two subscribing witnesses.

FREDERICK VERPLAST.

Witnesses:
B. J. NOYES,
H. B. DAVIS.